(12) United States Patent
Jordan et al.

(10) Patent No.: US 11,385,364 B2
(45) Date of Patent: Jul. 12, 2022

(54) PORTABLE NEUTRON IMAGING BASED NON-DESTRUCTIVE EVALUATION

(71) Applicant: University of Florida Research Foundation, Inc., Gainesville, FL (US)

(72) Inventors: Kelly A. Jordan, Gainesville, FL (US); Christopher C. Ferraro, Gainesville, FL (US)

(*) Notice: Subject to any disclaimer, the term of this patent is extended or adjusted under 35 U.S.C. 154(b) by 326 days.

(21) Appl. No.: 16/345,403

(22) PCT Filed: Oct. 27, 2017

(86) PCT No.: PCT/US2017/058843
§ 371 (c)(1),
(2) Date: Apr. 26, 2019

(87) PCT Pub. No.: WO2018/081620
PCT Pub. Date: May 3, 2018

(65) Prior Publication Data
US 2019/0265176 A1    Aug. 29, 2019

Related U.S. Application Data

(60) Provisional application No. 62/442,634, filed on Jan. 5, 2017, provisional application No. 62/414,538, filed on Oct. 28, 2016.

(51) Int. Cl.
*G01T 3/06* (2006.01)
*G01N 23/05* (2006.01)
*G01T 3/00* (2006.01)

(52) U.S. Cl.
CPC ............... *G01T 3/06* (2013.01); *G01N 23/05* (2013.01); *G01T 3/00* (2013.01); *G01N 2223/204* (2013.01); *G01N 2223/505* (2013.01)

(58) Field of Classification Search
CPC ............ G01N 23/05; G01N 2223/204; G01N 2223/505; G01T 3/00; G01T 3/06
USPC ....................................... 250/358.1
See application file for complete search history.

(56) References Cited

U.S. PATENT DOCUMENTS

| 5,594,253 | A | 1/1997 | Bueno et al. |
| 6,925,137 | B1 | 8/2005 | Forman et al. |
| 2003/0152186 | A1 | 8/2003 | Jurczyk et al. |
| 2003/0155530 | A1 | 8/2003 | Adnani et al. |
| 2008/0075232 | A1 | 3/2008 | Agrawal et al. |
| 2009/0108192 | A1 | 4/2009 | Groves |
| 2012/0019510 | A1 | 1/2012 | Bingham et al. |
| 2012/0106690 | A1 | 5/2012 | Tang et al. |
| 2012/0256094 | A1 | 10/2012 | Pozzi et al. |

OTHER PUBLICATIONS

International Search Report dated Dec. 28, 2017.

*Primary Examiner* — David P Porta
*Assistant Examiner* — Fani Polyzos Boosalis
(74) *Attorney, Agent, or Firm* — Thomas | Horstemeyer, LLP

(57) ABSTRACT

Various examples are provided for portable neutron imaging. In one example, a portable neutron-imaging system is described. A compact neutron source assembly can comprise an ion-beam bombardment source generating an isotropic source of monoenergetic neutrons. The neutron-imaging system does not include a moderator or collimator. Instead, the emission source and image-capture apparatus are placed in close proximity to an object to be imaged. Quality images were obtained with short exposure times of less than 20 seconds.

20 Claims, 6 Drawing Sheets

PORTABLE NEUTRON IMAGING BASED NON-DESTRUCTIVE EVALUATION

CROSS REFERENCE TO RELATED APPLICATIONS

This application is the 35 U.S.C. § 371 national stage application of PCT Application No. PCT/US2017/058843, filed Oct. 27, 2017, which claims priority to, and the benefit of, U.S. provisional application entitled "Portable Neutron Imaging Based Non-Destructive Evaluation of Transportation Infrastructure and Metallic Components" having Ser. No. 62/414,538, filed Oct. 28, 2016, and Ser. No. 62/442,634, filed Jan. 5, 2017, all of which are hereby incorporated by reference in their entireties.

BACKGROUND

X-ray imaging is a technique used to form images through dense materials that block or appreciably scatter optical radiation. Although x-ray imaging is widely used in the medical and security fields, it is not very useful for examining components used in transportation infrastructure. For example, half a centimeter of steel will block or severely attenuate most x-rays.

One method of examining metallic objects, such as steel structural components and connections on bridges, is to use ultrasonic imaging. Although this technique may work efficiently for single structural components, it does not provide the same efficiency for configurations in which the inspected object includes combinations of high-density/low-density interfaces. For example, steel support cable assemblies, multi-element assemblies, metallic components and structural elements embedded in concrete, etc. cannot be evaluated using ultrasonic imaging techniques because of the high-density/low-density interfaces which are high-scattering interfaces and can severely attenuate transmission of the ultrasonic waves. Consequently, a significant portion of the built infrastructure cannot be reliably inspected using ultrasound or x-ray imaging techniques.

Neutrons can pass through dense metallic structures and have been used to image steel structures containing internal high-density/low-density interfaces. In such neutron imaging systems, a moderator and collimator are placed by the neutron source to reduce the energy of the generated neutrons and to form a semi-collimated neutron beam that is directed to the object to be imaged. A nuclear reactor is one conventional source of neutrons used for neutron imaging, but such a reactor is not readily portable. Because the reactor is not portable, the object must be brought to the location of the reactor, which severely limits the applicability of neutron imaging because many structures to be imaged cannot be moved.

SUMMARY

Aspects of the present disclosure are related to portable neutron imaging that may be used to evaluate metallic components and form images through dense materials.

A portable, neutron imaging system is described that can be used for on-site inspection of transportation infrastructure components and other structures. The inventors have discovered that neutron images of surprisingly high quality can be formed using high-energy, monoenergetic neutrons produced from a portable fusion source without the need of a neutron moderator and collimator. The images can be formed quickly (e.g., less than 20 seconds in some aspects), and the quality of the images exceeds image quality for the same source when the moderator and collimator are used. High-energy neutrons may be produced in the neutron source using an energetic, ion beam of heavy hydrogen impinging on a target, for example, so that the energetic neutrons emit from a small spatial region of the target. An object to be imaged is placed in close proximity to the source, and an imaging plane is located in close proximity to the object.

Some embodiments relate to a neutron imaging system comprising a neutron source housed in a chamber and an imaging surface at which a component of an image-capture apparatus may be mounted. The imaging surface may be located within 200 cm or less of the neutron source. In some aspects, the imaging system excludes a neutron collimator. In some implementations, the imaging system excludes a neutron moderator. Some embodiments may further include an object region in which an object to be imaged is located, wherein the object region is between the neutron source and the imaging surface. According to some aspects, a neutron imaging system may include an image-capture apparatus having a component mounted at the imaging surface.

In one aspect, among others, a neutron imaging system comprises a neutron source assembly including a neutron emission source housed in a chamber; and an imaging surface located a distance from the neutron emission source at which an image-capture apparatus can be placed, where there is no neutron moderator and no collimator located between the neutron emission source and the imaging surface. In one or more aspects of these embodiments, the distance can be not more than 210 cm, or the distance can be between 4.5 cm and 100 cm. A distance between an object to be imaged by the neutron imaging system and the imaging surface can be less than or equal to, or not more than, 6 cm. A weight of the neutron source assembly can be less than or equal to, or not more than, 90 pounds.

In various aspects, the neutron imaging system can further comprise a high voltage supply connected to the neutron source assembly, wherein the neutron emission source is an ion-bombardment source. The neutron emission source can generate neutrons predominantly having energies of approximately 2.45 MeV. At least 95% of the generated neutrons can have energies between 2.4 MeV and 2.5 MeV. The neutron imaging system can further comprise a moveable boom on which the neutron source assembly can be mounted. The neutron imaging system can further comprise a vehicle to which the boom can be attached, wherein the vehicle is configured to transport the neutron source assembly and position the neutron source assembly with the boom for an imaging application.

In some aspects, the neutron imaging system can further comprise an image-capture apparatus located at the imaging surface. The image-capture apparatus an comprise a charge-coupled device array or complimentary metal-oxide-semiconductor imaging array or avalanche photodetector array. The image-capture apparatus can comprise a scintillating or phosphor screen. The image-capture apparatus can comprise photographic film. The image-capture apparatus can comprise a luminescent screen; and one or more imaging lenses that relay an image from the luminescent screen to a surface of an image-recording device.

In another aspect, a method of imaging an object using a neutron imaging system comprising generating neutrons with a neutron emission source; providing the generated neutrons without collimation and without moderation to illuminate an object to be imaged; and forming an image of an object using the uncollimated and unmoderated neutrons.

In one or more aspects, generating the neutrons can comprise performing ion-bombardment in a vacuum chamber that houses the neutron emission source. Ion bombardment of a target can be restricted to an area of the target that is not larger than 10 mm. In various aspects, the method can further comprise providing a boom attached to the vacuum chamber that allows for positioning the vacuum chamber and neutron emission source near an object to be imaged. Forming the image can comprise receiving electronic signals produced by neutrons that have passed through an object to be imaged and interact with a component of an image-capture apparatus. Forming the image can comprise producing photons at a screen by luminescence.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. It should be appreciated that the foregoing concepts, and additional concepts discussed below, may be arranged in any suitable combination, as the present disclosure is not limited in this respect. Furthermore, the individual features of the dependent claims, as well as all optional and preferred features and modifications of the described embodiments are combinable and interchangeable with one another. Other advantages and novel features of the present disclosure will become apparent from the following detailed description of various non-limiting embodiments when considered in conjunction with the accompanying figures.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
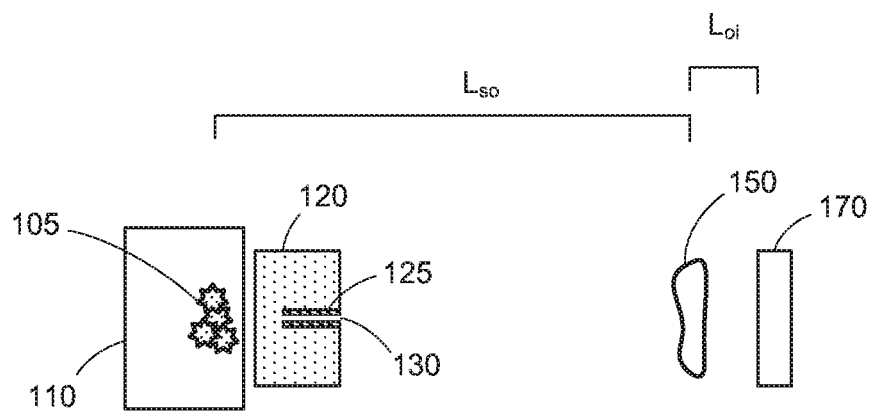
FIG. 1 depicts an example of a conventional neutron imaging system, in accordance with various embodiments of the present disclosure.

Disclosed herein are various embodiments related to portable neutron imaging that may be used to evaluate metallic components and form images through dense materials. Reference will now be made in detail to the description of the embodiments as illustrated in the drawings, wherein like reference numbers indicate like parts throughout the several views.

Referring to FIG. 1, depicted is an example of a conventional approach to neutron imaging. In conventional neutron imaging, a moderator 120 and a collimator 125 are placed between a neutron source 105 and an object 150 to be imaged. The neutron source may be enclosed in a chamber 110, such as a nuclear reactor chamber. The moderator 120 may extend around or cover at least a portion of the source, and reduce the energy of neutrons emitted by the source 105 by multiple scattering events. The collimator 125 may comprise a high-aspect-ratio, neutron-absorbing cylinder 130 that allows neutrons that are emitted within a small angular range to pass from (or through) the moderator 120 to the object 150 to be imaged. Because of a spatial extent, range of angles, and energy spread of neutrons exiting the collimator 125, there exists an optimal distance $L_{so}$ from the collimator 125 at which the object 150 is placed for imaging.

An image-capture apparatus 170 is placed behind the object 150, at a distance $L_{oi}$ from the object 150, to record an image of the neutrons that pass through the object 150. For such neutron imaging systems, the distance of the object 150 from the neutron source 105 and collimator 125 can be large (e.g., several meters or more) and the dose of neutrons at the object 150 can be low, requiring exposure times that may last several minutes to obtain an image of acceptable quality. Additionally, the collimator 125 may pass only a narrowly diverging beam, so that the field of view at the location of the object 150 is small (e.g., less than 20 cm).

A conventional neutron-imaging system, such as that depicted in FIG. 1, is not a feasible system for on-site evaluation of components of transportation infrastructure, building structures, larger machinery, or other large items. For example, the neutron source 105 is stationary and is typically very expensive to obtain and maintain, so that objects 150 must be brought to the source. In many cases, it is not feasible to remove an object in service (e.g., a bridge suspension cable, steel girding, concrete support structures, etc.) for inspection. Moreover, using a reactor as a source of neutrons poses regulatory challenges because the reactor contains radioactive material.

A compact neutron source (in an assembly weighing 60-90 pounds, and in some embodiments 80 pounds or less) has been developed that can be adapted to produce quality images over wide fields of view in short exposure times (less than 20 seconds). This portable neutron source can be used in a system to image and evaluate transportation infrastructures and other structures and machinery such as, e.g., steel support cable assemblies, multi-element assemblies, metallic components and structural elements embedded in concrete, etc. Examples of neutron sources include, but are not limited to, neutron generators (e.g., 2.45 MeV neutron sources, thermal neutron sources, 14.1 MeV neutron sources) produced by Adelphi Technology Inc., Redwood City, Calif. (http://www.adelphitech.com/products/products_overview.html).

Figure 2:
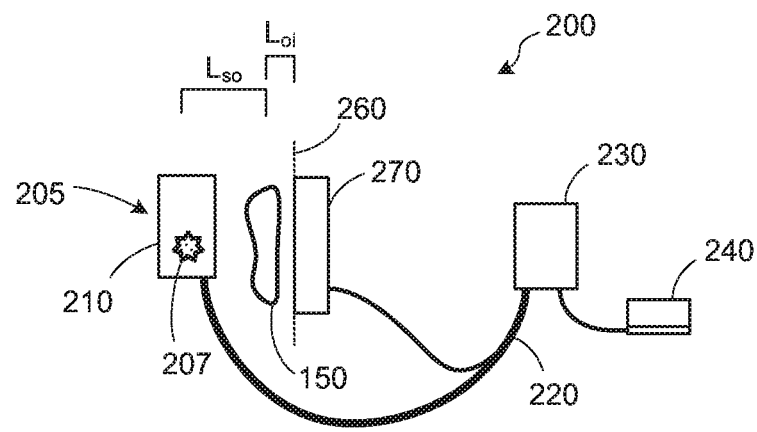
FIG. 2 depicts an example of a portable neutron imaging system, in accordance with various embodiments of the present disclosure.

Referring now to FIG. 2, shown is an example of a portable neutron-imaging system 200. Although conventional neutron imaging systems (FIG. 1) use a moderator 120 and collimator 125 to obtain images, quality images can be obtained by removing the moderator 120 and collimator 125 and reducing the distances ($L_{so}$ and $L_{oi}$) to the object 150 and image-capture apparatus 270. The quality of the resulting images is unexpectedly high in terms of spatial resolution and signal-to-noise, and exceeds the quality of images obtained with a conventional system that includes a moderator 120 and collimator 125, and is optimized for image acquisition. Additionally, the exposure times are about an order of magnitude less than those for the system having the moderator 120 and collimator 125, even though high-energy, monoenergetic neutrons are used.

According to various aspects of this disclosure, the portable neutron-imaging system 200 comprises a compact neutron source assembly 205. The portable neutron-imaging system 200 can also include an image-capture apparatus 270 and a high-voltage supply 230 connected to the source assembly 205 with, e.g., a flexible umbilicus 220. A computer or controller 240 can connect (or communicatively couple) to the high-voltage source 230 and the image-capture apparatus 270, and can be configured to issue commands to activate and deactivate the emission source 207, operate the high-voltage supply 230, as well as collect and/or process image data (e.g., employ filtering, edge-enhancement, 3D rendering, etc.) from the image-capture apparatus 270, among other operational tasks.

The neutron source assembly 205 can comprise a neutron emission source 207 that can be housed in a chamber 210. The chamber 210 can be a vacuum chamber for an ion-bombardment source, for example. The ion bombardment of a target can be restricted to an area of the target that is about 10 mm or less in diameter. The emission source 207 can generate neutrons by fusion, which can be emitted from an ion-beam/target interface for imaging an object 150. For example, an ion beam of heavy hydrogen atoms (e.g., ionized deuterium) may be accelerated at high energy (e.g., over 100 keV) toward a target whereupon deuterium-deuterium fusion occurs releasing 2.45 MeV neutrons. The ions may be accelerated toward the target by any suitable means (e.g., linear acceleration by applying a high voltage between the target and a hydrogen plasma, or using cyclotron acceleration). The ion beam may be focused on the target so that the energetic neutrons emit from a small spatial region of the target.

In some embodiments, the generated neutrons may be mono-energetic, for example, with greater than 95% of the neutrons having an energy between 2.4 and 2.5 MeV. In some cases, deuterium-tritium fusion can be used alternatively or additionally to produce energetic neutrons, and the neutrons can have higher energies and may not be mono-energetic. Because the neutron source 207 emits neutrons from the ion-beam/target interface, the emission source 207 is essentially a point source (less than a few millimeters in spatial extent) compared to the object(s) 150 imaged with the neutron-imaging system 200. In some implementations, a neutron source assembly 205 can comprise a radioactive source.

With the moderator 120 and collimator 125 removed, the source-to-object distance $L_{so}$ and object-to-image distance $L_{oi}$ can be significantly reduced over that of the conventional neutron-imaging system of FIG. 1. For example, $L_{so}$ may be between 4.5 cm and 210 cm in some cases, may be between 4.5 cm and 100 cm in some cases, or even between 4.5 cm and 50 cm in some implementations. At least a portion of the image-capture apparatus 270 may be placed in close proximity to the object 150 (e.g., within 6 cm from the object), though the placement may be greater than this distance in some implementations. When used on-site, the neutron source assembly 205 can be supported by a hydraulic arm or boom (or other appropriate support structure) and brought into close proximity of the object 150 to be imaged.

Because a moderator 120 and collimator 125 (FIG. 1) are not used and the neutron source 207 emits energetic neutrons isotropically, the entire object 150 can be exposed for imaging. Removal of the moderator 120 and collimator 125 also allows the object 150 to be placed much closer to the emission source 207, thereby increasing the flux of neutrons through the object 150. The increased flux enables shorter exposure times. Potentially, a large field of view can be recorded with the image-capture apparatus 270.

However, the neutrons emitted from the effective point source 207 will pass through the object at different angles. To mitigate the angular variation over a large field of view, a curved imaging screen may be placed at a curved imaging surface 260 behind the object 150, opposite the emission source 207. Although a flat imaging screen may be suitable for most applications where a smaller field of view is adequate for evaluating an object 150 or a portion of an object 150. In some embodiments, the neutron source assembly 205 and image-capture apparatus 270 can be scanned (or moved) along an object 150 and multiple images recorded to evaluate large objects.

In some implementations, a small amount of neutron moderation may be employed. For example, a thin film of boron may be placed near the emission source 207 or between the emission source 207 and object 150 to reduce the energy of the emitted neutrons seen by the object 150.

According to some aspects, either or both of the neutron source assembly 205 and/or the image-capture apparatus 270 may be mounted on one or more booms (not shown) that may be controlled to position the neutron source assembly 205 and image-capture apparatus 270 on opposite sides of the object 150 being imaged. The one or more booms may be mounted to a platform or other stationary object or alternatively may be mounted on a truck or other movable vehicle. Further, the booms may be controlled with motors, hydraulics or other actuators to achieve a desired position. According to some embodiments, a positioning controller can control these actuators to move the neutron source assembly 205 and image-capture apparatus 270 relative to the object 150 being inspected.

The positioning controller may be synchronized with data collection apparatus (e.g., computer or controller 240) such that images of the object 150 being inspected can be captured in many different locations and even from many different directions. These images may be processed by the computer or controller 240 to generate a projection or volumetric image of the object being inspected. The compact nature of the neutron emission source 207 makes such motion possible with a flexible umbilicus 220 carrying high voltage and power to the neutron source assembly 205, and other low power, control, and data connections to the neutron source assembly 205 and image-capture apparatus 270.

Figure 3:
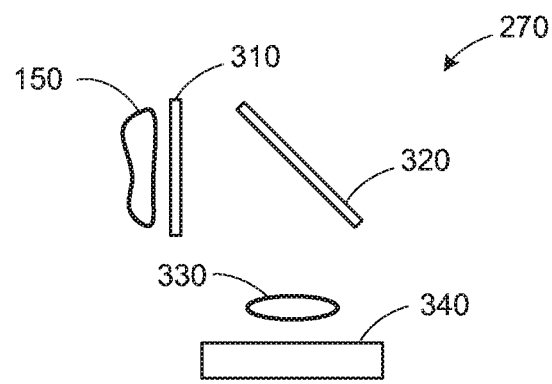
FIG. 3 depicts an example of an image-capture apparatus of the portable neutron imaging system of FIG. 2, in accordance with various embodiments of the present disclosure.

An example of the image-capture apparatus 270 is depicted in FIG. 3, although the implementation is not limited to the image-capture apparatus 270 illustrated in FIG. 3. According to some embodiments, the image-capture apparatus 270 can comprise a scintillating or phosphor screen 310 that is located in close proximity to the object 150, a mirror 320, one or more imaging lenses 330, and an image-recording device 340. The screen 310, which can be flat or curved, can be placed at an imaging surface 260 located behind the object 150 opposite the neutron emission source 207 as shown in FIG. 2. The screen 310 can convert some of the passing neutron energy to optical emissions by luminescence. The location of the imaging surface 260 may be specified for the neutron-imaging system 200 with respect to the object 150 or with reference to the effective point source 207 of emitted neutrons, and can be less than about 200 cm from the emission source 207.

The imaging lens or lenses 330 can relay an image from the screen 310 (via mirror 320) to a surface of the image-recording device 340. In some embodiments, the image-recording device may comprise photographic film. In some embodiments, the image-recording device 340 may comprise a charge-coupled device (CCD) array or complementary metal-oxide-semiconductor (CMOS) imaging array. Images captured by the CCD or CMOS imaging arrays can be recorded and/or processed digitally by, e.g., the computer or controller 240 of FIG. 2.

Other image-capture apparatus 270 can be used in other implementations. For more sensitive detection, a phosphor screen 310 can be backed with an image-intensifying microchannel plate, which can be coupled to a CCD, CMOS, or avalanche photodetector array with a fiber-optic bundle. Alternatively, a phosphor-backed, neutron-detecting microchannel plate can be used instead of a phosphor screen 310. More sensitive detection can enable dynamic, real-time imaging of moving parts.

A portable neutron imaging system 200 according to the present disclosure can be used to image infrastructural components, portions of building structures, components of machinery, piping, cabling, devices which include connected metallic components and nonmetallic components, and implanted medical devices. A portable neutron imaging system can also be used to scan and view cargo in large containers and paneled vehicles. The ability to move or relocate the compact neutron source assembly 205 and/or image-capture assembly 270 allows for imaging of components installed in a wide range of existing structures.

Examples of images recorded with the portable neutron imaging system of FIG. 2 are shown in FIGS. 4A-7. The imaged objects were located within 50 cm ($L_{so}$) of the neutron emission source 207. Exposure times were less than 20 seconds. The images were formed with a phosphor screen which was imaged onto a CCD array and captured digitally. The neutron-imaging system 200 was operated without a moderator 120 and collimator 125 (FIG. 1) as described above using a neutron source 207 that emitted neutrons of about 2.45 MeV. Surprisingly, the images are clear and of good quality, revealing fine details of the structures behind regions having high-density/low-density interfaces. The image quality is surprising detailed, because conventional practice employed a moderator to slow the neutrons (to thermal energies in many cases) so that there would be sufficient interaction of the neutrons with an object to form suitable images and to be at an energy more favorable for neutron detection.

Figure 4A:
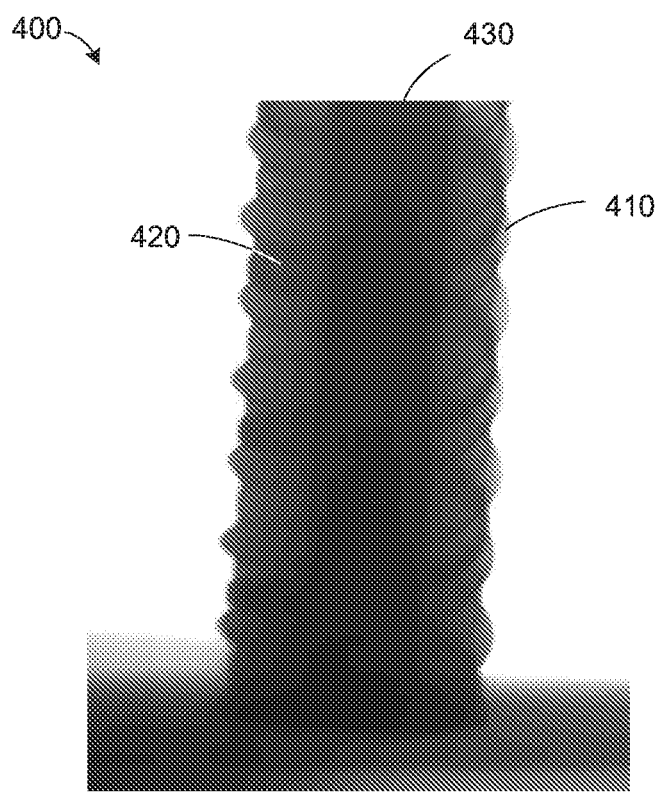
FIG. 4A is an image of a section of a steel post-tensioning (PT) tendon duct with multi-stranded tendons that has been obtained with the portable neutron imaging system of FIG. 2, in accordance with various embodiments of the present disclosure.
Figure 4B:
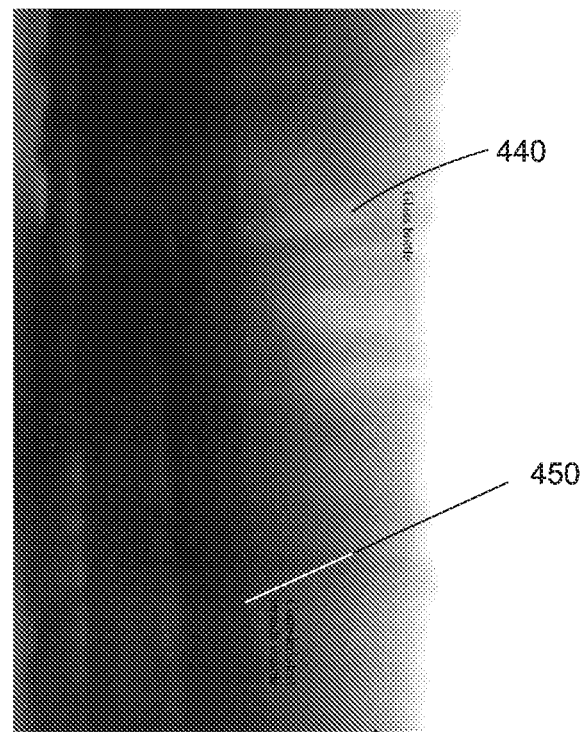
FIG. 4B is an image of a section of a PT tendon duct with corroded multi-stranded tendons as well as air voids that has been obtained with the portable neutron imaging system of FIG. 2, in accordance with various embodiments of the present disclosure.

FIG. 4A shows a neutron image 400 of a portion of a post-tensioning tendon duct filled with grout 420 and internal PT tendons 430. The system includes a metallic PT tendon duct 410, surrounding three steel tendons 430 composed of 7-wire strands. The fill material comprises grout 420, commonly referred to as PT grout, which fills the region between the duct shield 410 and steel tendons 430. The neutron-imaging system 200 is capable of imaging metallic and non-metallic tendon-ducts 410 filled with steel tendons 430 and grout 420, and can be used for imaging other cabling or structures composed of concrete. FIG. 4B shows another neutron image of a portion of the post-tensioning tendon duct 410 filled with grout 420 and internal PT tendons 430. In this image, a glass bottle 440 within the grout is visible, as well as corroded steel tendons 450.

Figure 5:
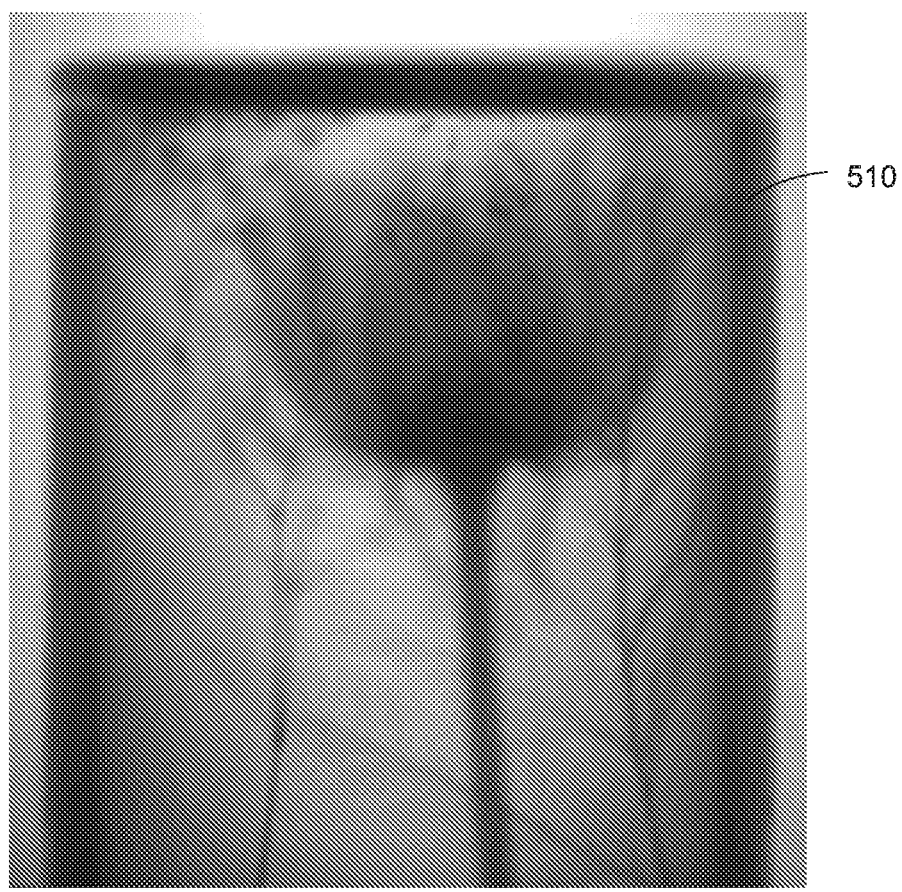
FIG. 5 is an image of a flower within a clay vessel that has been obtained with the portable neutron imaging system of FIG. 2, in accordance with various embodiments of the present disclosure.
Figure 6:
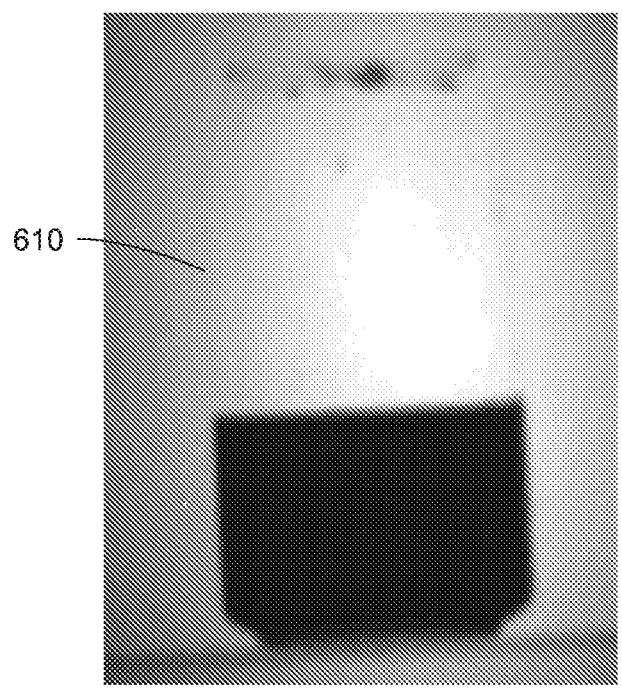
FIG. 6 is an image of a can containing liquid that has been obtained with the portable neutron imaging system of FIG. 2, in accordance with various embodiments of the present disclosure.
Figure 7:
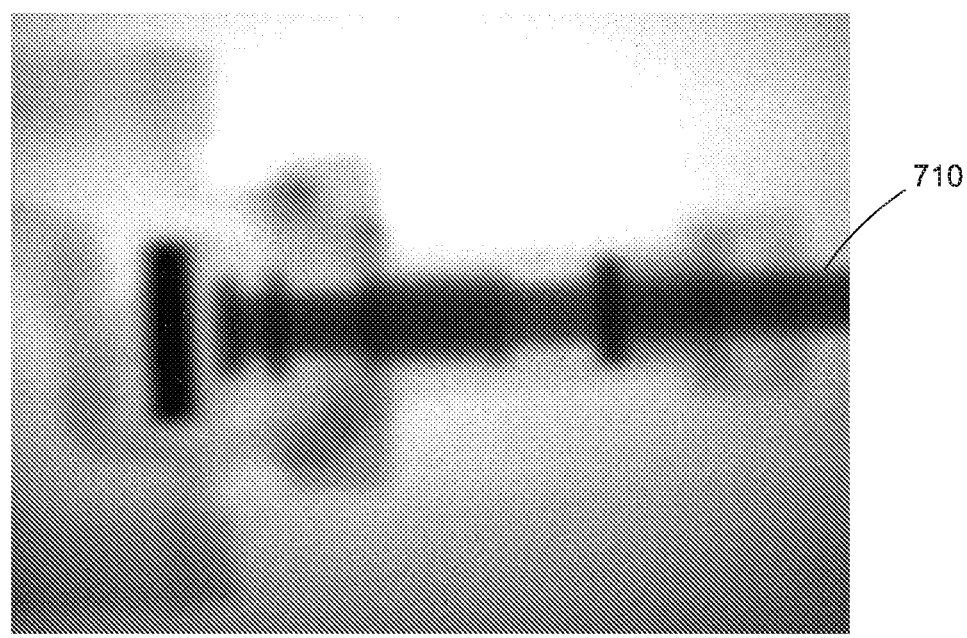
FIG. 7 is an image of a valve containing fluid that has been obtained with the portable neutron imaging system of FIG. 2, in accordance with various embodiments of the present disclosure.

The sensitivity of the neutron imaging is illustrated in FIG. 5, which shows a neutron image of a rose and baby's breath contained in a clay vessel 510 having a wall thickness of about 1 cm. Details of the flowers' stems and veins indicate a high spatial resolution provided by the neutron imaging system 200. FIG. 6 shows a neutron image of a can that is partially filled with soda. The walls 610 of the aluminum can are visible in the image, indicating a high spatial resolution. FIG. 7 shows a neutron image of a mechanical valve assembly 700 stopping a fluid. The components of the valve (including a valve stem 710) are clearly visible.

Figure 8:
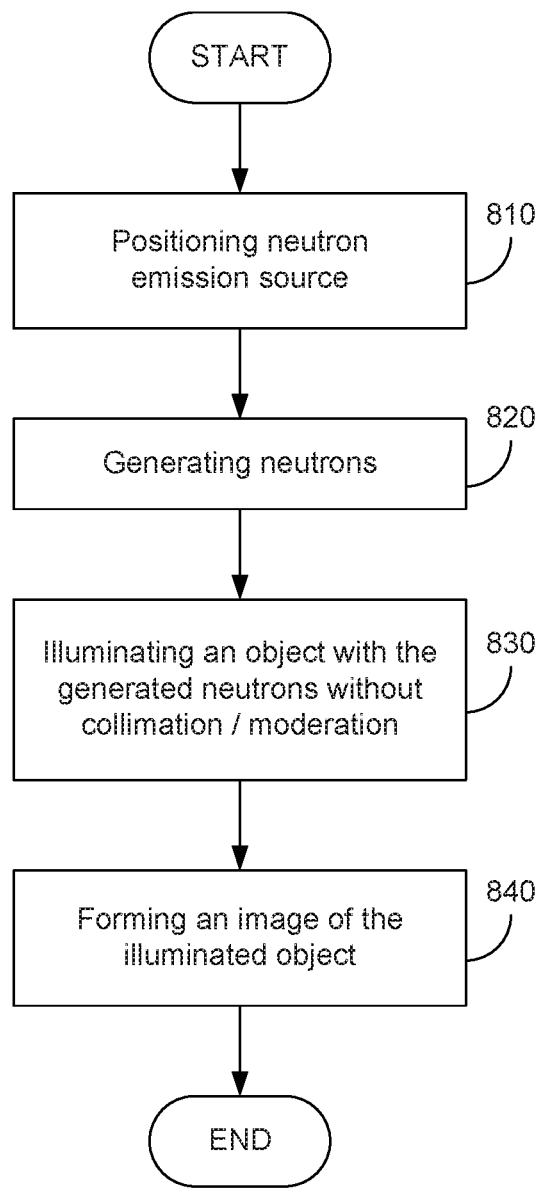
FIG. 8 is a flow chart illustrating an example of a portable neutron imaging process, in accordance with various embodiments of the present disclosure.

In some implementations, the imaging can be controlled by the computer or controller 240. Referring to FIG. 8, shown is a flow chart illustrating an example of the imaging process. Beginning at 810, the neutron emission source 207 is positioned with respect to image an object 150, as illustrated in FIG. 2. For example, the neutron emission source 207 can be attached to a boom to facilitate positioning and orientation of the neutron emission source 207 (and chamber 210) with respect to the object 150. An image-capture apparatus 270 can also be positioned opposite the neutron emission source 207. With the neutron emission source 207 in position, neutrons can be generated at 820 and used to illuminate the object being imaged at 830. The generated neutrons are provided without collimation and without moderation, which allows for faster and higher quality images. The images of the object are formed at 840 using the uncollimated and unmoderated neutrons. The image capture apparatus 270 can be used to convert the neutrons that pass through the object into electronic images as illustrated in FIGS. 4A-7.

Figure 9:
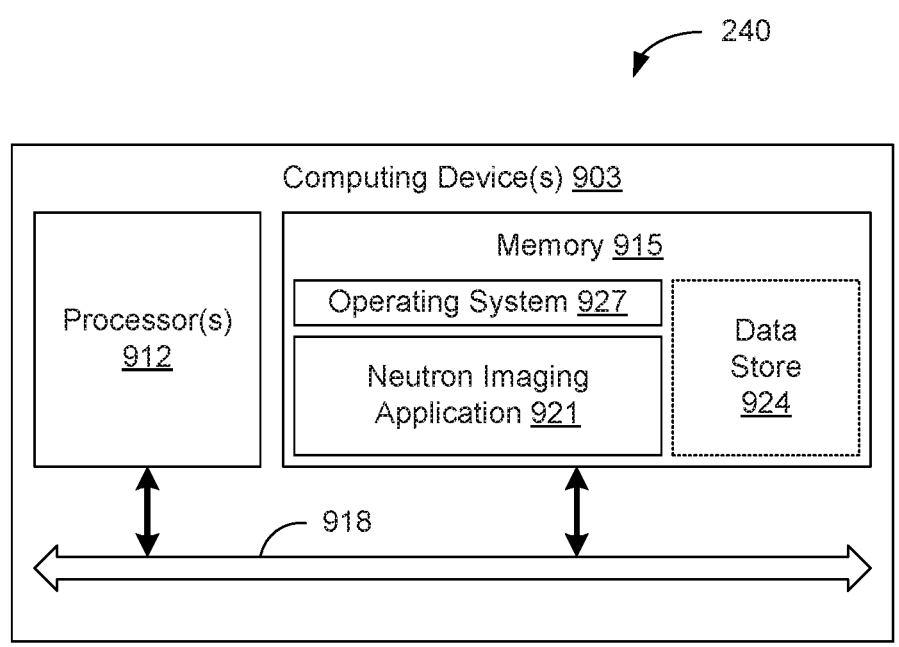
FIG. 9 is a block diagram illustrating an example of a computer or controller of the portable neutron imaging system of FIG. 2, in accordance with various embodiments of the present disclosure.

Referring now to FIG. 9, shown is an example of an example of a computer or controller 240 that may be utilized for the portable neutron imaging disclosed herein. The computer or controller 240 can comprise a computing device 903 or other processing device, which includes at least one processor circuit, for example, having a processor 912 and a memory 915, both of which are coupled to a local interface 918. To this end, the computing device(s) 903 may comprise, for example, a mobile computing device (e.g., laptop, tablet, smart phone, etc.) or any other system providing computing capability. The computing device(s) 903 may include, for example, one or more display devices and various peripheral devices. The local interface 918 may comprise, for example, a data bus with an accompanying address/control bus or other bus structure as can be appreciated.

Stored in the memory 915 can be both data and several components that are executable by the processor 912. In particular, stored in the memory 915 and executable by the processor 912 include a neutron imaging application 921 and potentially other applications. Also stored in the memory 915 may be a data store 924 and other data. The data stored in the data store 924, for example, is associated with the operation of the various applications and/or functional entities described above. For example, the data store may include image data, databases, object libraries, and other data or information as can be understood. In addition, an operating system 927 may be stored in the memory 915 and executable by the processor 912. The data store 924 may be may be located in a single computing device or may be dispersed among many different devices. The components executed on the computing device 903 include, for example, the information extraction application 918 and other systems, applications, services, processes, engines, or functionality not discussed in detail herein. It is understood that there may be other applications that are stored in the memory 915 and are executable by the processor 912 as can be appreciated. Where any component discussed herein is implemented in the form of software, any one of a number of programming languages may be employed.

A number of software components can be stored in the memory 915 and are executable by the processor 912. In this respect, the term "executable" means a program file that is in a form that can ultimately be run by the processor 912. Examples of executable programs may be, for example, a compiled program that can be translated into machine instructions in a format that can be loaded into a random access portion of the memory 915 and run by the processor 912, source code that may be expressed in proper format such as object code that is capable of being loaded into a random access portion of the memory 915 and executed by the processor 912, or source code that may be interpreted by another executable program to generate instructions in a random access portion of the memory 915 to be executed by the processor 912, etc. An executable program may be stored in any portion or component of the memory 915 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 912 may represent multiple processors 912 and the memory 915 may represent multiple memories 915 that operate in parallel processing circuits, respectively. In such a case, the local interface 918 may be an appropriate network that facilitates communication between any two of the multiple processors 912, between any processor 912 and any of the memories 915, or between any two of the memories 915, etc. The local interface 918 may comprise additional systems designed to coordinate this communication, including, for example, performing load balancing. The processor 912 may be of electrical or of some other available construction.

Although the neutron imaging application 921, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the information extraction application 921, that comprises software or instructions can be embodied in any non-transitory computer-readable medium for use by or in connection with an instruction execution system such as, for example, a processor 912 in a computer system or other system. In this sense, the logic may comprise, for example, statements including instructions and declarations that can be fetched from the computer-readable medium and executed by the instruction execution system. The flowchart of FIG. 8 shows an example of the architecture, functionality, and operation of possible implementations of a neutron imaging application. In this regard, each block can represent a module, segment, or portion of code, which comprises one or more executable instructions for implementing the specified logical function(s). It should also be noted that in some alternative implementations, the functions noted in the blocks may occur out of the order noted in FIG. 8. For example, two blocks shown in succession in FIG. 8 may in fact be executed substantially concurrently or the blocks may sometimes be executed in a different or reverse order, depending upon the functionality involved. Alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A neutron imaging system, comprising:
   a neutron source assembly including a neutron emission source housed in a chamber;
   an imaging surface located a distance from the neutron emission source at which an image-capture apparatus can be placed, where there is no neutron moderator and no collimator located between the neutron emission source and the imaging surface; and
   the image-capture apparatus located at the imaging surface proximate to an object, where the image-capture apparatus captures an image of the object from uncollimated and unmoderated neutrons generated by the neutron emission source.

2. The neutron imaging system of claim 1, wherein the distance is not more than 210 cm.

3. The neutron imaging system of claim 1, wherein the distance is between 4.5 cm and 100 cm.

4. The neutron imaging system of claim 3, wherein a distance between the object to be imaged by the neutron imaging system and the imaging surface is not more than 6 cm.

5. The neutron imaging system of claim 1, wherein a weight of the neutron source assembly is not more than 90 pounds.

6. The neutron imaging system of claim 1, further comprising a high voltage supply connected to the neutron source assembly, wherein the neutron emission source is an ion-bombardment source.

7. The neutron imaging system of claim 1, wherein the neutron emission source generates neutrons predominantly having energies of approximately 2.45 MeV.

8. The neutron imaging system of claim 7, wherein at least 95% of the generated neutrons have energies between 2.4 MeV and 2.5 MeV.

9. The neutron imaging system of claim 1, further comprising a moveable boom on which the neutron source assembly is mounted.

10. The neutron imaging system of claim 9, further comprising a vehicle to which the boom is attached, wherein the vehicle is configured to transport the neutron source assembly and position the neutron source assembly with the boom for an imaging application.

11. The neutron imaging system of claim 1, wherein the image-capture apparatus comprises a charge-coupled device array or complimentary metal-oxide-semiconductor imaging array or avalanche photodetector array.

12. The neutron imaging system of claim 1, wherein the image-capture apparatus comprises a scintillating or phosphor screen.

13. The neutron imaging system of claim 1, wherein the image-capture apparatus comprises photographic film.

14. The neutron imaging system of claim 1, wherein the image-capture apparatus comprises:
   a luminescent screen; and
   one or more imaging lenses that relay an image from the luminescent screen to a surface of an image-recording device.

15. A method of imaging an object using a neutron imaging system, the method comprising:
   generating neutrons with a neutron emission source;
   providing the generated neutrons without collimation and without moderation to illuminate an object to be imaged; and
   forming an image of the object using the uncollimated and unmoderated neutrons, the image captured by an image-capture apparatus located at an imaging surface proximate to the object and on a side of the object opposite the neutron emission source.

16. The method of claim 15, wherein generating the neutrons comprises performing ion-bombardment in a vacuum chamber that houses the neutron emission source.

17. The method of claim 16, wherein ion bombardment of a target is restricted to an area of the target that is not larger than 10 mm.

18. The method of claim 16, further comprising providing a boom attached to the vacuum chamber that allows for positioning the vacuum chamber and neutron emission source near an object to be imaged.

19. The method of claim 15, wherein forming the image comprises receiving electronic signals produced by neutrons that have passed through the object to be imaged and that have interacted with a component of the image-capture apparatus.

20. The method of claim 15, wherein forming the image comprises producing photons at a screen by luminescence.

* * * * *